Patented May 15, 1951

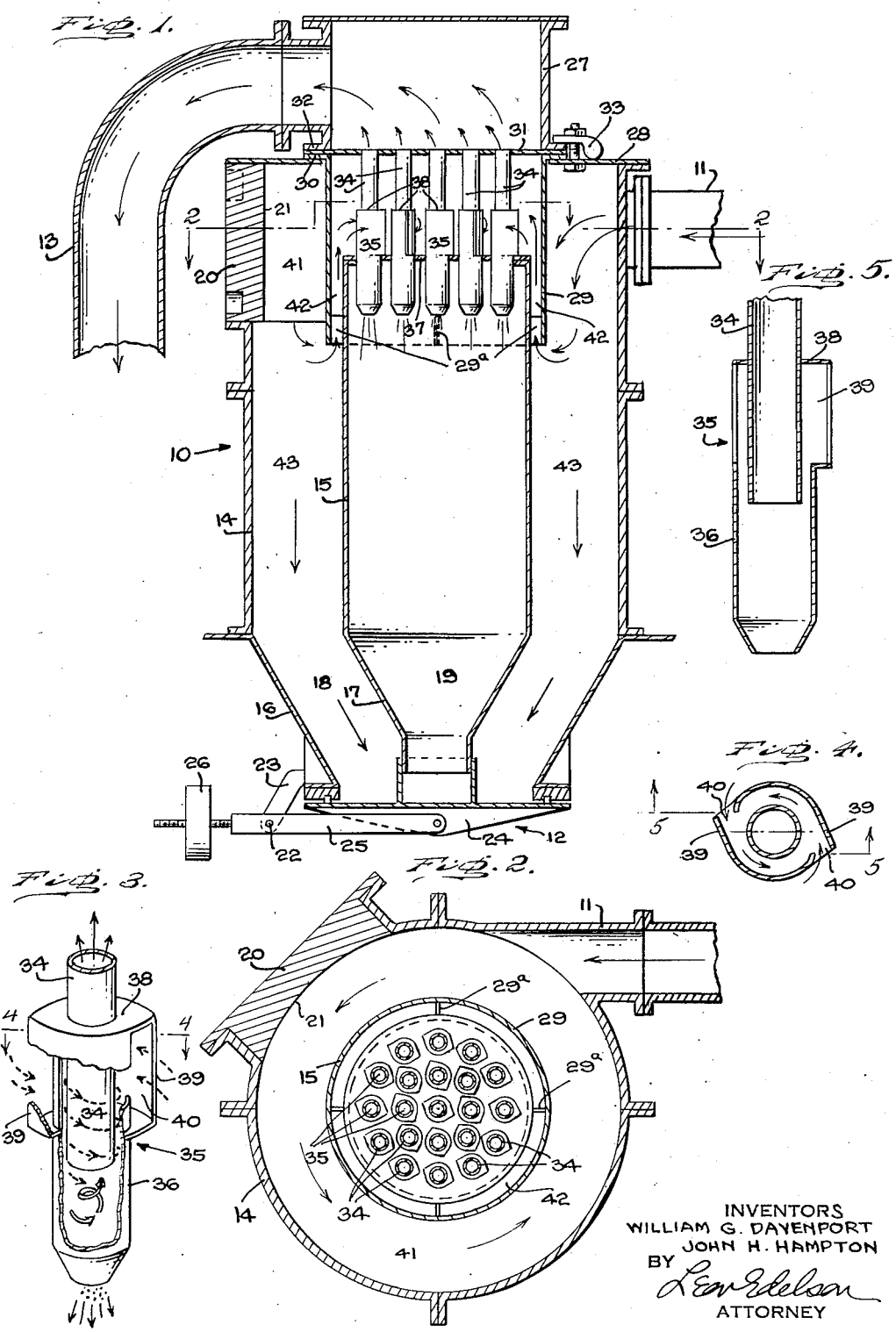

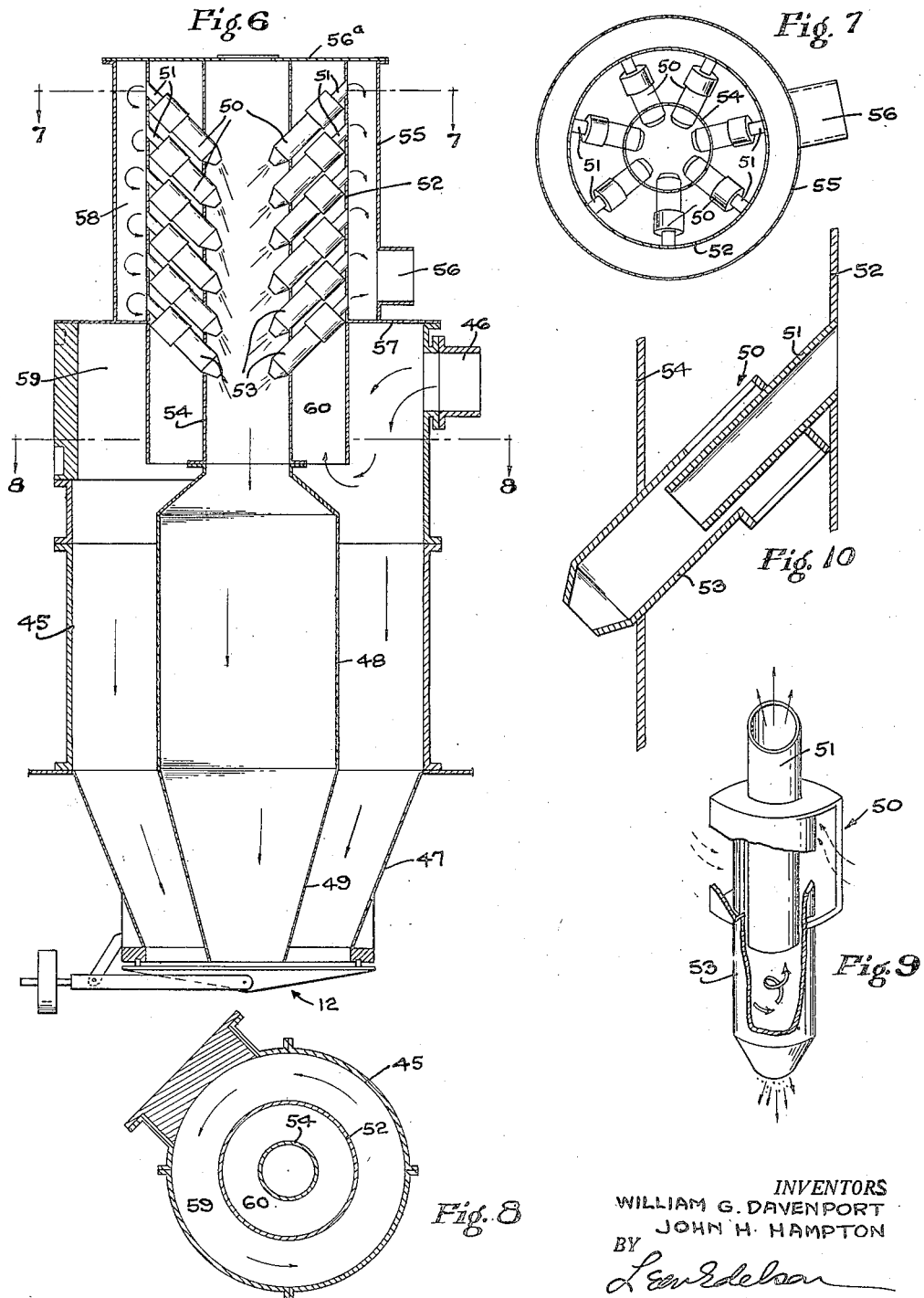

2,553,175

UNITED STATES PATENT OFFICE 2,553,175

APPARATUS FOR COLLECTING ASH AND DUST

William G. Davenport, Glenside, Pa., and John H. Hampton, Oaklyn, N. J., assignors to Beaumont Birch Company, Philadelphia, Pa., a corporation of Pennsylvania Application February 1, 1949, Serial No. 73,874

9 Claims. (Cl. 183—83)

This invention relates generally to vacuum operated dust and ash handling apparatus and more particularly to an improved intermittently vacuum operated apparatus having a two-stage separator for removing dust and ash from dust and ash laden air.

In the operation of burning solid powdered fuel or the like there are certain residual products of combustion such as ash, ash fly, soot and dust which are present in the fuel burning apparatus, and which it is desired to remove automatically. In addition it is desired to automatically remove dust collected by dust collector systems wherever this may be, at the base of a furnace stack, the rear pass of the boilers or in hoppers forming part of a dust collecting system. This is accomplished by means of an apparatus having one or more pipes or conduits vacuum operated to draw air bearing dust and ash from the aforementioned places into a combined separator and receiver for the dust and ash removed from the air.

It is accordingly among the principal objects of the present invention to provide a vacuum operated dust and ash handling apparatus operative to efficiently and expeditiously remove a maximum amount of dust and ash from its carrying current of air prior to discharge of the latter to atmosphere.

A further object of the present invention is to provide a two-stage separator for a dust and ash handling apparatus which is of such construction and so operative that in the first stage of separation the larger and heavier particles are separated from the air by centrifugal action of the air stream within an annular chamber formed between a pair of vertically disposed concentric cylinders of the separator, while in the second stage of separation the air is freed of the remaining lighter particles by means of a plurality of individual centrifugal separator units suitably disposed internally of the inner cylinder of the separator.

With the above objects in view, the invention further resides in the combination and arrangement of parts and in the details of construction herein described and claimed, it being understood that the specific embodiments of the invention described herein are illustrative and that modifications thereof falling within the scope of the appended claims will be apparent to persons skilled in the art.

In the accompanying drawings,

Figure 1 is a vertical transverse sectional view through a separator and receiver apparatus constructed in accordance with the present invention;

Figure 2 is a horizontal sectional view of the apparatus as taken on line 2—2 of Figure 1;

Figure 3 is a perspective view showing in detail the construction of one of the plurality of individual centrifugal separator units of the second-stage separating means;

Figure 4 is a horizontal sectional view of the individual separator unit of Figure 3 as taken on line 4—4 thereof;

Figure 5 is a vertical sectional view of a portion of the individual separator unit of Figure 3 as taken on line 5—5 of Figure 4;

Figure 6 is a vertical transverse sectional view of a modified construction of the apparatus of the present invention wherein the several internal separator units are disposed angularly with respect to the central vertical axis of the apparatus;

Figure 7 is a horizontal transverse sectional view of the modified apparatus as taken on line 7—7 of Figure 6;

Figure 8 is a sectional view as taken on line 8—8 of Figure 6;

Figure 9 is a perspective view of one of the internal separator units as employed in the modified apparatus of Figure 6; and Figure 10 is a longitudinal sectional view of the separator unit of Figure 9 showing its mounting in the apparatus of Figure 6.

In an intermittently vacuum operated dust and ash handling apparatus of the present type, there is usually provided a cylindrically shaped separator and receiver 10, an inlet tube 11 for dust and ash laden air, a dust and ash discharge gate 12 and an air discharge outlet tube 13 in which is located a steam exhauster (not shown) for creating a vacuum within the interior of the separator 10 and inlet tube 11. This vacuum, when intermittently created by intermittent controlled operation of the steam exhauster, causes the dust and ash laden air to be drawn through the inlet tube 11 into the separator 10 and out through the outlet tube 13; the vacuum at the same time being effective to close the discharge gate 12, the latter opening automatically when the vacuum is released.

Referring now more particularly to the drawings, it will be observed that the ash and dust receiver and separator 10 of the present invention generally comprises a pair of vertically disposed concentric cylinders 14 and 15, the lower ends of which are respectively continued in inwardly tapered conical shape, as at 16 and 17, to form a pair of concentric hoppers 18 and 19. It will be noted that inlet tube 11, drawing dust and ash laden air from those places from which it is desired that dust and ash be removed, is operatively connected in tangential relation to the upper end of the outer cylinder 14, as clearly appears in Figures 1 and 2. As the air is drawn into cylinder 14 it is caused to follow a circular path by striking and following the inner surface of the cylinder. Inasmuch as the point of initial impingement of the air stream against the internal surface of the cylinder is subject to considerable wearing action due to the abrasive character of the particles in the air stream, the cylinder 14, in accordance with the present invention, is provided with a relatively heavy impingement block 20 removably secured to the cylinder 14 to form a part of its wall and to provide an arcuate impingement surface 21 for the ash and dust laden air entering the cylinder from the inlet tube 11.

Operatively related with the discharge ends of hoppers 18 and 19 is a counterweighted closure gate 12 hingedly supported by pin 22 in arms 23 extending outwardly from the lower end of the outer cylinder 16. The gate 12 preferably comprises a circular plate member 24 pivotally secured to the inner end of an arm 25 which in turn is counter balanced on the pivot pin 22 by a weight 26 adjustably mounted on the outer end of the arm 25. The outer circumferential portion of the upper surface of the plate 24 is adapted to be in air-sealing contact with the lower face of conical member 16 when there is a vacuum within receiver 10. However, with each intermittent release of the vacuum the gate 12 automatically opens to discharge accumulated dust and ash from hoppers 18 and 19 to any convenient means for subsequent removal.

An open-bottom closed-top cylindrical member 27 having the outlet tube 13 operatively connected to one side thereof is secured to a centrally apertured flat plate member 28 disposed across the top of the cylinder 14 so that air may flow from the receiver and separator 10 upwardly through the member 27 for final discharge from the outlet tube 13. A relatively short cylindrical member 29 concentric with the outer cylinder 14 extends into the same through the central aperture in the circular plate member 28 to a point just below the lower edge of the impingement block 20. The member 29 preferably serves as the support for the inner cylinder 15, being joined thereto by circumferentially spaced vane-like members 29ª having their opposite edges welded or otherwise respectively secured to the proximate surfaces of the concentric portions of the members 15 and 29.

The member 29 is supported in spaced, concentric relation with respect to the outer cylinder 14 by means of an annular flange 30 which is designed to rest on and be secured in any suitable manner to the top plate member 28 of the outer cylinder 14. Also supported upon this plate member 28 is a circular plate 31 the marginal edge of which overlies the flange 30, the flange 30 and the overlying portion of the plate 31 being disposed between the plate member 28 and a flange 32 formed at the lower end of the cylindrical air exhaust member 27, the two flanges 30 and 32 with the intervening plate 31 being secured together and to the top 28 in an air tight relation by any suitable clamping means, such as circumferentially spaced dogs 33.

The centrally disposed flat plate 31 has formed therein a plurality of circular openings in each of which is secured the upper end of an open ended tube 34 forming the inner element of an individual dust and ash separator unit 35. In the apparatus illustrated, twenty-one of these units are provided to conjointly effect the second stage of separation hereinbefore referred to. The external tubes 36 of these second stage separators 35 respectively extend through a plurality of circular openings in a baffle plate 37 secured to and closing the upper end of the inner cylinder 15, the several tubes being secured in any suitable manner to the baffle plate 37 through which they extend.

Referring now to Figures 3, 4 and 5, it will be noted that each second stage separator unit 35 comprises the concentric inner and outer tubes 34 and 36 with the inner tube 34 extending upwardly through the otherwise closed top 38 of the outer tube 36 for substantially half the length of the latter to form an annular passage about the upper portion of the tube 36. The tube 36 has a pair of diametrically opposed substantially parallel tangential extensions 39—39 providing inlet openings 40—40 at diametrically opposite sides of the tube 36, each of these openings being in communication with the annular chamber formed between the tubes 34 and 36. As a consequence of this construction, air entering either one or both of these openings 40 will move in a circular path through the annular chamber between the concentric tubes 34 and 36 of each second stage separator unit and thence pass into the lower end of the tube 34 and upwardly therethrough into the top air discharge chamber 27 of the apparatus. As the dust-laden air traverses the annular chamber of each second stage separator unit, the dust and ash with which it may be laden is separated by centrifugal action and drops by gravity through the open bottom end of the tube 36 into the inner hopper 19.

In operation, ash and dust laden air is drawn into the receiver and separator 10 through inlet 11 by vacuum created by the steam exhauster operating in suction outlet or discharge tube 13. The dust laden air, impinging against the curved surface of the impingement block 20, is caused to follow a whirling circular path around the annular chamber 41 between the cylinders 14 and 29 with the result that the heavier particles in the air are separated therefrom by centrifugal action and are dropped by gravity into the hopper 18. It will be noted that the annular chamber 41 formed between the cylinders 14 and 29 is in communication with the interior of the cylinder 29 by way of an annular passage 42 formed between the cylinder 29 and the inner cylinder 15. Inasmuch as the vacuum pull in the air discharge conduit 13 tends constantly to draw the dust and ash laden air from the chamber 41 directly into the passage 42 in the immediate region of the lower open end of the latter, the air is relatively inactive and still in the zone 43 between the concentric cylinders 14 and 15 and consequently the ash and dust which has been separated from the air is free to fall by gravity into the hopper 18.

The air which still moves in a circular path through the chamber 41 and which is drawn into the passage 42 conveys the unremoved lighter particles of dust and ash through the annular passage 42 and into the second stage separators by way of the inlet openings 40—40 of the latter, the dust and ash being removed from the air as it circulates through the annular passages formed between the tubes 34 and 36 of these separators. The secondarily removed dust and ash is then dropped by gravity into the hopper 19. At the end of each cycle of intermittent operation of the steam exhauster, which may be for any desired period of time, the vacuum is released whereupon the flow of air ceases and the gate 12 automatically opens to discharge the accumulated dust and ash in hoppers 18 and 19. Upon re-creation of the vacuum in the next cycle of operation, air again is drawn through tube 11 and gate 12 is caused to be closed, whereupon the operation above described is repeated.

It will be noted that in the form of apparatus above described, the several internal or secondary centrifugal separators 35 may be mounted in unitary assembly with the vertically spaced parallel plates 31 and 37 to provide a unit which is readily adapted for operative installation within the interior of the apparatus, such unitary assembly being disposed centrally within the cylinder 29 with the marginal edge of its upper plate 31 resting upon the centrally apertured plate member 28 and with its lower plate 37 resting upon the flanged top edge of the main inner cylinder 15. In such form of the apparatus the axes of the secondary centrifugal units are all disposed in substantially parallel relation.

Figures 6 to 10 inclusive illustrate a modified form of the apparatus wherein the secondary units are each disposed with their central axes extending angularly with respect to the central axis of the apparatus, such modified arrangement making possible the utilization of a materially increased number of secondary units without increase in size of the apparatus as a whole, thereby materially increasing the volume of air that may be handled by the apparatus and at the same time increasing the percentage of dust and ash removed from the air.

In this modified form of the apparatus, it will be observed that the primary or first stage separator, as in the form of apparatus previously described, includes a main outer cylinder 45 having a tangential air inlet 46 and a tapered hopper 47 at its lower end, the apparatus further including a main inner cylinder 48 arranged concentrically within the outer cylinder 45 and having a tapered hopper 49 concentric with respect to the hopper 47. The concentric hoppers 47 and 49 are commonly closed against discharge of material accumulated therein by a vacuum operated gate which is in all material respects similar in construction and operation to the gate 12 of Figure 1.

Mounted in the top end of the main outer cylinder 45 for operative association with the inner cylinder 48 is a unitary assembly of secondary centrifugal separator units 50 each generally similar in form and construction to the units 35 of previously described apparatus. The secondary units 50 are, however, arranged with their longitudinal axes each extending at an angle to the central vertical axis of the primary separator, the several units being disposed in vertically spaced groups each consisting of a plurality of units spaced circumferentially about the central vertical axis of the apparatus. Thus, in the arrangement illustrated, forty-two secondary units 50 are employed in six vertically spaced groups of seven each.

In order to most efficiently mount the several units in their assembled relation as shown, it is preferred to arrange them in the form of a unitary assembly in which the inner tubes 51 thereof have their outer extremities suitably secured flush in the wall of a cylindrical member 52, while the outer tubes 53 thereof project through and are secured to the wall of a cylindrical member 54, the latter being arranged in spaced concentric relation with respect to the cylindrical member 52. The member 54 serves as a baffle to close off the air inlet ports of the secondary separators from the interior of the member 48, just as the baffle plate 37 of Figure 1 serves to seal the secondary separator air inlet ports from the interior of the member 15. As most clearly appears in Figure 10, the outer ends of the tubes 51 are preferably chamfered so that when in registry with their respective openings in the wall of the member 52 the tube ends are flush with the outer surface of said member.

Embracing the cylindrical member 52 is an outer concentric shell 55 having an air discharge outlet 56 extending radially thereof, the two cylindrical members 52 and 54 and the outer shell 55 being commonly closed off at their upper ends by a top closure plate 55ª. A circular plate 57, which extends across the bottom of the shell 55 and into contact with the outer wall surface of the cylindrical member 52, serves not only to close off the bottom of the annular chamber 58 formed between the member 52 and the shell 55 but also to close off the top of the annular space 59 formed between the main outer cylinder 14 and the cylindrical member 52. In addition, the plate 57 serves to support the secondary unit assembly operatively within the top end of the main outer cylinder 14, and in position for securement of the lower end of the innermost cylindrical member 54 in registry with the upper of the inner cylinder 48 of the primary separator.

As indicated by the directional arrows in Figure 6, the dust laden air entering the primary separator by way of the inlet 46 whirls about the annular space 59 and by centrifugal action the heavier particles in the air stream are separated therefrom and gravitationally dropped into the hopper 47. The current of air thus separated of its heavier particles is continued to be drawn by suction upwardly into the space 60 formed between the cylindrical members 52 and 54 and thence through the several secondary separator units 50 into the chamber 58 for discharge therefrom by way of the discharge outlet 56. The lighter particles of material which are separated by the secondary units from the air stream are discharged gravitationally into the central cylindrical member 54 and thence into the hopper 49, such gravitational discharge being facilitated by rather sharply inclining the axes of the secondary units with respect to the horizontal, e. g., approximately 45 degrees.

It will be observed that the present invention provides an intermittently vacuum operated receiver and separator for dust and ash laden air which efficiently and effectively separates the dust and ash from the air in two stages by means of centrifugal separators, the first stage comprising a single large centrifugal separator having concentric cylinders and the second stage comprising a plurality of individual centrifugal separators within the inner cylinder of the first stage separator. It will be noted that the single large first stage separator and the individual second stage separators in combination therewith all operate on the same principle of concentric inner and outer concentric tubes or cylinders with the inner member extending down into the outer member through the closed top thereof for a distance beyond the tangential air inlet opening adjacent the upper end of each outer member.

It will be understood, of course, that the present invention is susceptible of various changes and modifications which may be made from time to time without departing from the general principles or real spirit thereof, and it is accordingly intended to claim the same broadly, as well as specifically, as indicated by the appended claims.

What is claimed to be new and useful is:

1. A centrifugal ash and dust separator designed for intermittent operation under vacuum comprising a cylindrical outer casing having a conically shaped hopper at its lower end and a tangential air intake immediately adjacent its upper end, a centrally apertured top closure plate for said casing, an inner cylindrical member suspended from said closure plate in concentric relation with respect to said casing and projecting downwardly into the latter to a point below said air intake to provide a primary annular chamber within which ash and dust-laden air is whirled to effect separation of dust and ash from the air by centrifugal action, a top closure plate for said inner cylindrical member, a plurality of secondary centrifugal separators disposed below said last-mentioned top closure plate each having an open-ended inner tube in registry with an opening in said latter plate and an outer shell arranged in concentric, spaced relation relatively to said tube, said shell having diametrically opposed air inlet ports in communication with a secondary annular chamber formed between the concentric tube and shell of each secondary centrifugal separator and being further provided with an opening at its lower end for discharge of particles separated from the air circulating through said secondary chamber, and an internal casing commonly embracing said outer shells of the secondary centrifugal separators and supported concentrically within said outer cylinder, the upper end portion of said internal casing being disposed internally of said inner cylindrical member in spaced relation thereto to provide an annular passage affording communication between said primary annular chamber and the inlet ports to the secondary annular chambers of the secondary centrifugal separators, said internal casing being provided at its lower end with a hopper concentric with respect to that of said outer casing.

2. In a centrifugal ash and dust separator as defined in claim 1 wherein the upper ends of the inner tubes of said secondary centrifugal separators are commonly in communication with an air discharge conduit, while the lower ends of the outer shells respectively embracing said tubes are commonly in communication with the interior of said internal casing.

3. In a centrifugal ash and dust separator as defined in claim 1 wherein said outer cylindrical casing is provided in the wall thereof with a relatively heavy impingement block having a curved surface directly in line with the axis of said air intake.

4. A centrifugal ash and dust separator designed for intermittent operation under vacuum comprising a cylindrical outer member having a conically shaped hopper at its lower end and a tangential air intake adjacent its upper end, a cylindrical inner member concentrically disposed interiorly of said outer member and having a conically shaped hopper at its lower end concentric with respect to that of said outer member, a centrally apertured top closure plate at the upper end of said outer member, a cylindrical element depending from said top closure plate with its bore in registry with the aperture of said closure plate, said cylindrical element extending downwardly below the tangential air intake of the outer cylindrical member with its circular wall spaced between the concentric walls of said outer and inner members, and a plurality of secondary centrifugal separators each having an open-ended inner tube and an outer shell embracing said inner tube to provide an annular space therebetween, said shell having diametrically opposed air inlet ports in communication with said annular space and being further provided with an opening at its lower end for discharge of heavier-than-air particles separated from the air circulating about said annular space, the discharge openings of all of said outer shells of said secondary separators being commonly in communication with the interior of said cylindrical inner member, baffle means for closing off the air inlet ports of said secondary separators from said cylindrical inner member while affording communication thereof with the interior of said outer member, and an air discharge chamber commonly in communication with the outer ends of the inner tubes of all of said secondary separators, said discharge chamber having an air discharge outlet in communication with a conduit subject to intermittent suction pull on the air stream entering the air intake of the outer cylindrical member.

5. In a centrifugal ash and dust separator as defined in claim 4 wherein said baffle means is in the form of a plate extending across the top of said inner cylindrical member and having formed therein a plurality of openings into which are respectively fitted the outer shells of said secondary separators whereby the discharge openings of said shells are disposed below while the air inlet ports thereof are disposed above said baffle plate.

6. In a centrifugal ash and dust separator as defined in claim 4 wherein said baffle means is in the form of a cylindrical upward extension of said cylindrical inner member, said extension being provided with a plurality of openings respectively adapted to snugly receive therein the several outer shells of the secondary separators with the discharge openings thereof commonly in communication with the interior of said extension and closed off from the exterior thereof.

7. In a centrifugal ash and dust separator as defined in claim 4 wherein said baffle means is in the form of a cylindrical upward extension of said cylindrical inner member and is provided with a series of vertically spaced groups of circumferentially spaced openings for respectively accommodating therein the outer shells of the secondary separators with their discharge openings in communication only with the interior of said extension.

8. In a centrifugal ash and dust separator as defined in claim 4 wherein said baffle means is in the form of a cylindrical upward extension of said cylindrical inner member and is provided with a series of vertically spaced groups of circumferentially spaced openings for respectively accommodating therein the outer shells of the secondary separators with their discharge openings in communication only with the interior of said extension, and wherein said depending cylindrical element is also provided with a cylindrical extension arranged in spaced concentric relation to said first-mentioned extension and having formed therein a plurality of openings respectively adapted to receive the air discharge extremities of the inner tubes of the several secondary separators.

9. A centrifugal ash and dust separator designed for intermittent operation under vacuum comprising main cylindrical outer and inner members arranged in spaced concentric relation and respectively provided at their lower ends with conical hoppers adapted to be commonly closed by a vacuum operated closure gate, a centrally apertured top closure member at the upper end of said main outer member, a cylindrical member depending from said top closure plate with its bore in registry with the aperture of said closure plate and with its wall spaced between the concentric walls of said main outer and inner members, a pair of concentric cylindrical members respectively disposed in upward extension of said main inner member and said depending cylindrical member, an external shell founded upon said top closure member in spaced concentric relation to the upward extension of said depending member to provide an annular air discharge chamber, an air discharge opening formed in the wall of said external shell, a top closure member extending commonly across the upper ends of said cylindrical extensions and said external shell, and a plurality of secondary centrifugal separators each having an open-ended central tube and an embracing outer tube forming an annular space therebetween, said outer tube having diametrically opposed air inlet ports in communication with said annular space and being open only at one end thereof for discharge of heavier-than-air particles separated from the air stream circulating about said annular space, said secondary centrifugal separators being respectively supported between the concentric upward extensions aforesaid with the outer tubes thereof respectively projecting through openings formed in the inner one of said concentric extensions and the inner tubes thereof respectively in fixed registry with openings formed in the outer one of said concentric extensions whereby the said inner tubes of the several secondary separators are commonly in communication with said air discharge chamber, the secondary separators being each disposed with its longitudinal axis inclined with respect to the central vertical axis of the separator.

WILLIAM G. DAVENPORT.
JOHN H. HAMPTON.

REFERENCES CITED

The following references are of record in the file of this patent:

UNITED STATES PATENTS

| Number | Name | Date |
| --- | --- | --- |
| 1,333,325 | McGee | Mar. 9, 1920 |
| 1,416,995 | Stroud | May 28, 1922 |
| 2,281,610 | Watson et al. | Mar. 5, 1942 |
| 2,372,514 | Pootjes | Mar. 27, 1945 |
| 2,432,757 | Weniger | Dec. 16, 1947 |